(12) United States Patent
Pequignot, II et al.

(10) Patent No.: US 9,156,375 B2
(45) Date of Patent: Oct. 13, 2015

(54) LOW PROFILE LOW FRICTION VEHICLE SEAT SUPPORT

(71) Applicants: ATWOOD MOBILE PRODUCTS, LLC, Elkhart, IN (US); POLARIS INDUSTRIES, INC., Medina, MN (US)

(72) Inventors: Michael James Pequignot, II, Fremont, IN (US); Timothy John Roeglin, Elkhart, IN (US); Shashidhar Channarayapatna Suryanarayana, Secunderabad, IN (US); Shane Lee Doehrmann, White Pigeon, MI (US); Andrew John Miller, Forest Lake, MN (US)

(73) Assignees: Dometic Sweden AB, Solna (SE); Polaris Industries Inc., Medina, MN (US)

( * ) Notice: Subject to any disclaimer, the term of this patent is extended or adjusted under 35 U.S.C. 154(b) by 0 days.

(21) Appl. No.: 14/209,294

(22) Filed: Mar. 13, 2014

(65) Prior Publication Data

US 2014/0265416 A1    Sep. 18, 2014

Related U.S. Application Data

(60) Provisional application No. 61/851,806, filed on Mar. 13, 2013.

(51) Int. Cl.
*B60N 2/02* (2006.01)
*B60N 2/07* (2006.01)
*B60N 2/08* (2006.01)
*B60N 2/24* (2006.01)

(52) U.S. Cl.
CPC ............ *B60N 2/0715* (2013.01); *B60N 2/0705* (2013.01); *B60N 2/0825* (2013.01); *B60N 2/0856* (2013.01); *B60N 2/24* (2013.01)

(58) Field of Classification Search
CPC .. B60N 2/0715; B60N 2/0856; B60N 2/0705; B60N 2/0825; B60N 2/24
USPC .............................. 296/65.13, 65.14; 248/429
See application file for complete search history.

(56) References Cited

U.S. PATENT DOCUMENTS

| | | |
|---|---|---|
| 5,171,055 A | 12/1992 | Hutchison et al. |
| 6,945,505 B2 | 9/2005 | Hohnl et al. |
| 7,478,861 B1 | 1/2009 | Kubota |
| 7,648,112 B2 | 1/2010 | Wu et al. |
| 7,648,115 B2 | 1/2010 | Lambert et al. |
| 2005/0285006 A1* | 12/2005 | Koutsky et al. ............... 248/424 |
| 2012/0223500 A1 | 9/2012 | Kinsman et al. |
| 2012/0318949 A1* | 12/2012 | Braun ........................... 248/429 |

* cited by examiner

*Primary Examiner* — Lori L Lyjak
(74) *Attorney, Agent, or Firm* — Shumaker, Loop & Kendrick, LLP (57) ABSTRACT

An all terrain vehicle with a low profile low friction seat support is described. The vehicle includes a rail in a longitudinal direction of the vehicle and a seat support with a top member and a bottom member. The seat support is adapted for securing on the rail, and the seat support is adjustable in position in the longitudinal direction of the vehicle. A lock is provided for releasably locking the seat support in a forward position, a rearward position and therebetween. A low friction support member is positioned between the top and bottom members. At least two channels are formed in the top member. One of the channels matches the shape of the support member, and the other channel matches the shape of the rail for close registration between the top member and the support member and the rails. The seat support is highly compartmentalized, sturdier, and safer for vehicle occupants.

11 Claims, 8 Drawing Sheets

LOW PROFILE LOW FRICTION VEHICLE SEAT SUPPORT

REFERENCE TO RELATED APPLICATION

This application claims priority to U.S. Provisional Application No. 61/851,806, filed Mar. 13, 2013, which is hereby incorporated by reference.

BACKGROUND OF THE INVENTION

Adjustable seats in vehicles are known. All terrain vehicles (ATVs) and other off-highway vehicles, however, present dynamics that make traditional fleet vehicle seats and their mounting set-ups impractical. Seats for these rugged vehicles must be sturdier, and it low center of gravity is preferred because the attitude of the vehicle can be radical at times. Torsion forces produced by heavier occupants, especially during travel, can also be dangerous. As a result, the seat support may bend and deform, or become loose and fail to properly function over time.

Off-highway and ATV seats and mount assemblies are crude and underdeveloped in their design. Most, for example, cannot be adjusted to accommodate small stature individuals, women and children. The seat position relative to the steering controls is one-size-fits-all. This is problematic because these vehicles have increased in number and power. This increases risk of injury due to occupant collision with the interior or being thrown from the vehicle because of a poor fit between passenger and seat. Moreover, ATV seats that are adjustable require the occupant to stand to adjust them, which is inconvenient and dangerous when occupants try to make the adjustment without stopping and standing.

Thus, it would be advantageous to provide an improved low profile low friction vehicle seat support assembly useful in off-highway vehicles. It would be advantageous if such a seat support was sturdier, adjustable while sitting in it, and functioned more along the lines of a seat mount set-up of a normal fleet vehicle, which is smoother and easier to adjust. Also desirable is a compartmentalized retrofit unit that would not add to the seat height of the original design.

SUMMARY OF THE INVENTION

The new support is particularly useful for off-highway and industrial vehicles. The unique combination offers extreme compartmentalization of a seat frame that is lightweight with an automotive feel to its adjusters. The new support allows vehicles to be retrofitted to an adjustable seat without compromising the seat height of the original equipment design. The novel seat support is characterized by a low profile slider mechanism combined with a low friction support member engineered at close registrations to yield improved actuation, support and ease of manufacture.

The vehicle seat support includes a top member with opposite sides, a front and a back. The top member carries a pair of top rails. The rails are located at the opposite sides. A bottom member with opposite sides, a front and a back is provided. The bottom member supports a pair of bottom rails one each located at the opposite sides of the bottom member. The top and bottom rails are adapted, respectively, to be slidably engageable upon bearings contained between the respective top and bottom rails so that the top member can move relative to the bottom member between a forward position and a rearward position. An adjustable lock is provided for releasably locking the top member to the bottom member in the forward position, the rearward position and therebetween. At least one low friction member resides between the top and bottom members for supporting the top member during the movement.

In another aspect of the invention, a vehicle with an adjustable seat support is provided. The seat support includes a top member and a bottom member and is adapted for securing on a rail. The rail is in a longitudinal direction of the vehicle. The seat support is adjustable in position in the longitudinal direction of the vehicle. A low profile lock is provided for releasably locking the seat support in a forward position, a rearward position and therebetween. The top and bottom members may ride upon a low friction support member positioned between the top and bottom members. At least two channels are formed in the top member. One of the channels matches the shape of the support member, and the other channel matches the shape of the rail for close registration between the top member and the support member and the rails.

Objects of the invention include providing an especially compartmentalized seat support with low center of gravity. The novel seat support improves manufacture and vehicle seating dynamics for off-highway and utility vehicles as well. Related objects and advantages of the invention will be apparent from the following description.

BRIEF DESCRIPTION OF THE DRAWINGS

The details of the invention, both as to its structure and operation, may be obtained by a review of the accompanying drawings, in which.

DETAILED DESCRIPTION OF INVENTION

For the purposes of promoting an understanding of the principles of the invention, specific embodiments have been described. It should nevertheless be understood that the description is intended to be illustrative and not restrictive in character, and that no limitation of the scope of the invention is intended. Any alterations and further modifications in the described compartments, elements, processes, or devices, and any further applications of the principles of the invention as described herein, are contemplated as would normally occur to one skilled in the art to which the invention relates.

Figure 7:
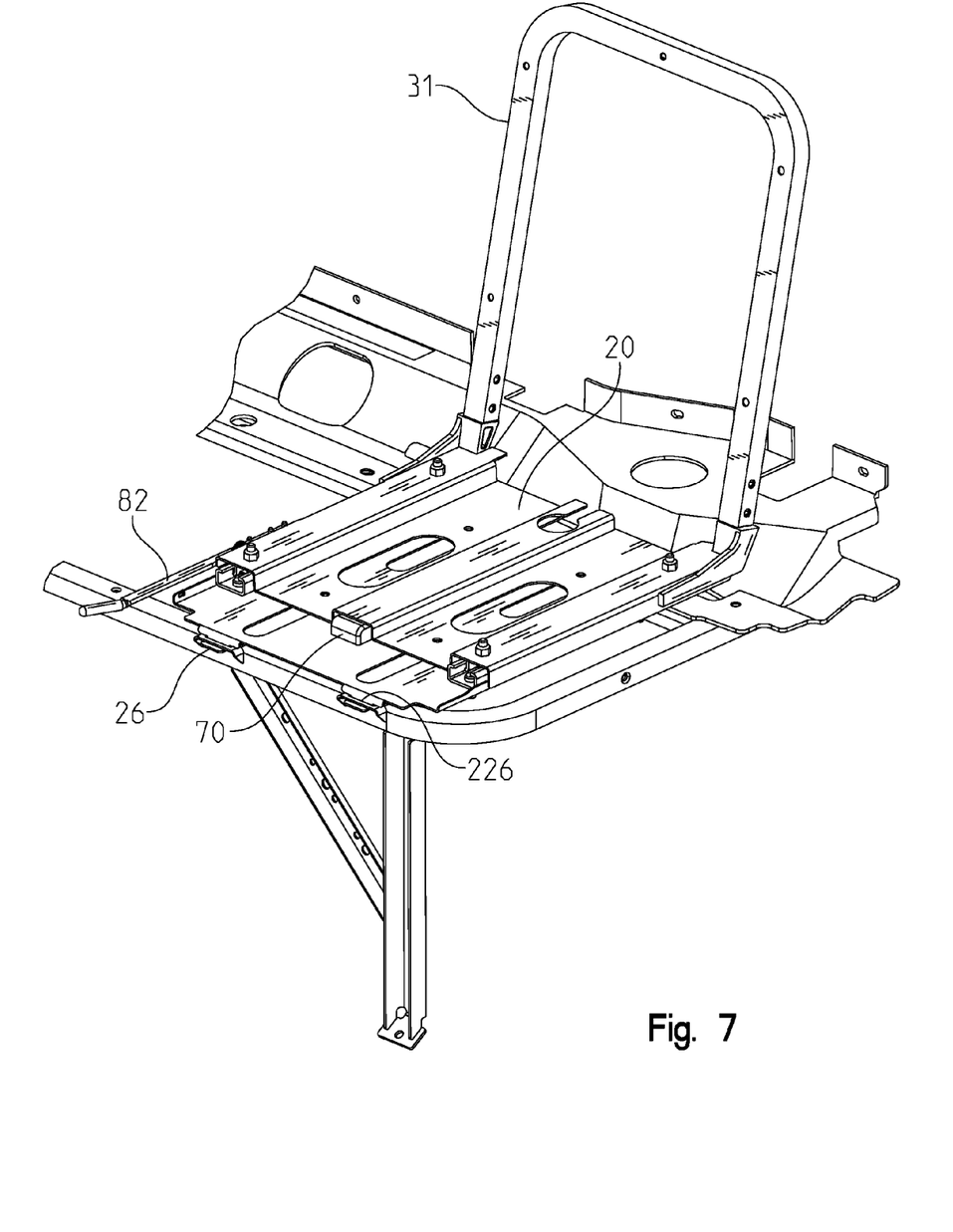
FIG. 7 is an elevated partial cutaway perspective view of an embodiment of the vehicle of the invention shown with the seat support secured to the frame.

Referring to the figures, one commercial embodiment of the Applicants' low profile low friction vehicle seat support assembly 10 includes a top member 20 with opposite sides 21, 23, a front 22, which includes tabs 26, and a back 24. Posts 29 support a tubular back 31. The top member carries a pair of top rails 30 one each located at the opposite sides and housed within a raised channel 28. Each top rail 30 includes equally spaced cutouts 34 extending along the side 32, preferably the inboard side when the seat support is positioned in a vehicle, as shown in FIG. 7. A bottom member 40 with opposite sides 41, 43, a front 42 and a back 44 supports a pair of bottom rails 50 one each located at the opposite sides 41, 43 of the bottom member. The top rails 30 and the bottom rails 50 may be secured, respectively, to the top and bottom member 20, 40 using known fasteners. Preferably, the rails 30, 50 are bolted to their corresponding member, as best shown in FIG. 4.

The top and bottom members 20, 40 as well as the rails 30, 50 are preferably, formed from a rigid material with good dimensional stability, such as plastic, metal or the like. Most preferably, the component members, back and rails are formed from sheet and tube steel. The sheet steel preferably has a gauge between about twelve (12) and sixteen (16). In some applications, depending upon the weight of the vehicle occupant, the lesser gauge steel permits the top member to bend slightly so as to have supportive contact with the low friction support member 70, as described below.

Figure 3:
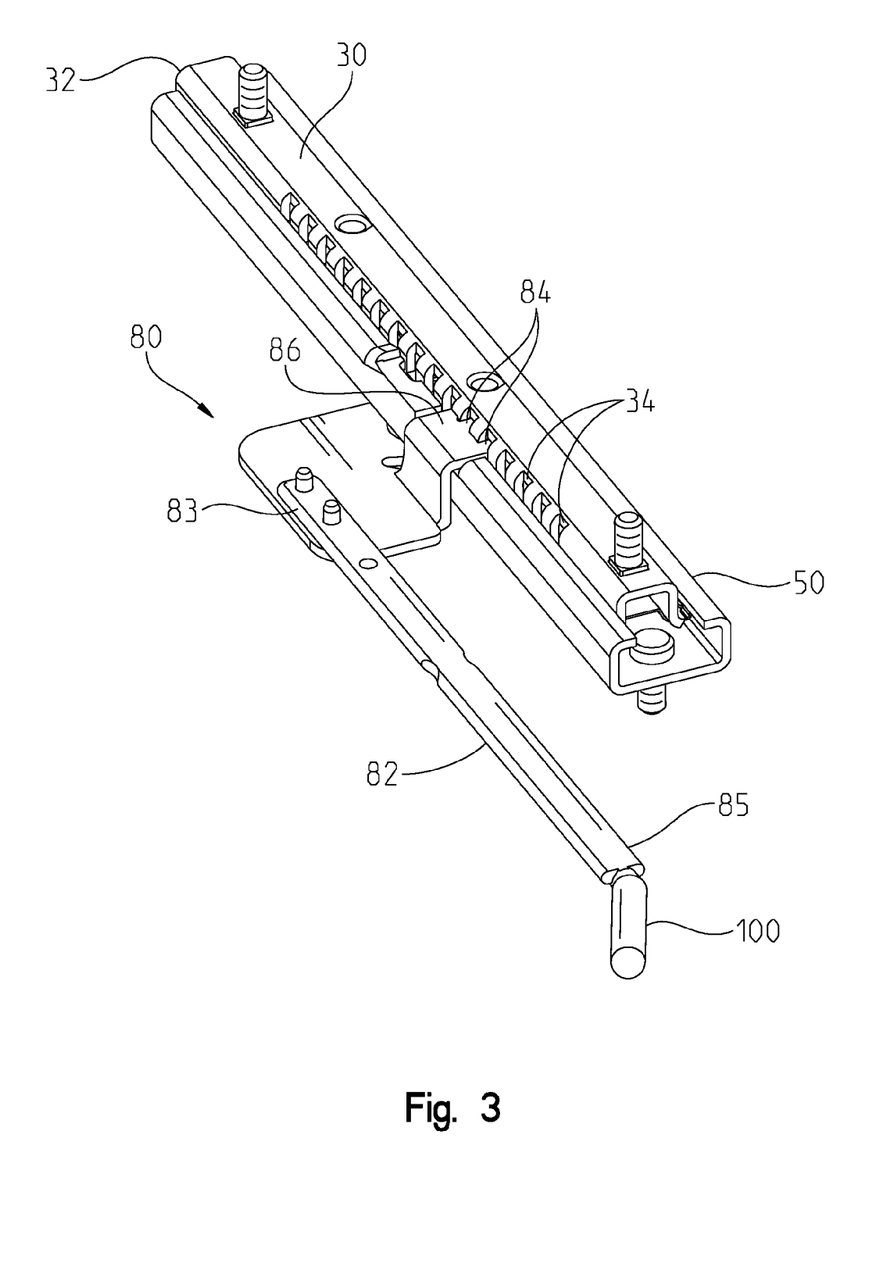
FIG. 3 is an exploded perspective view of an embodiment of the rail and lock of the invention.
Figure 4:
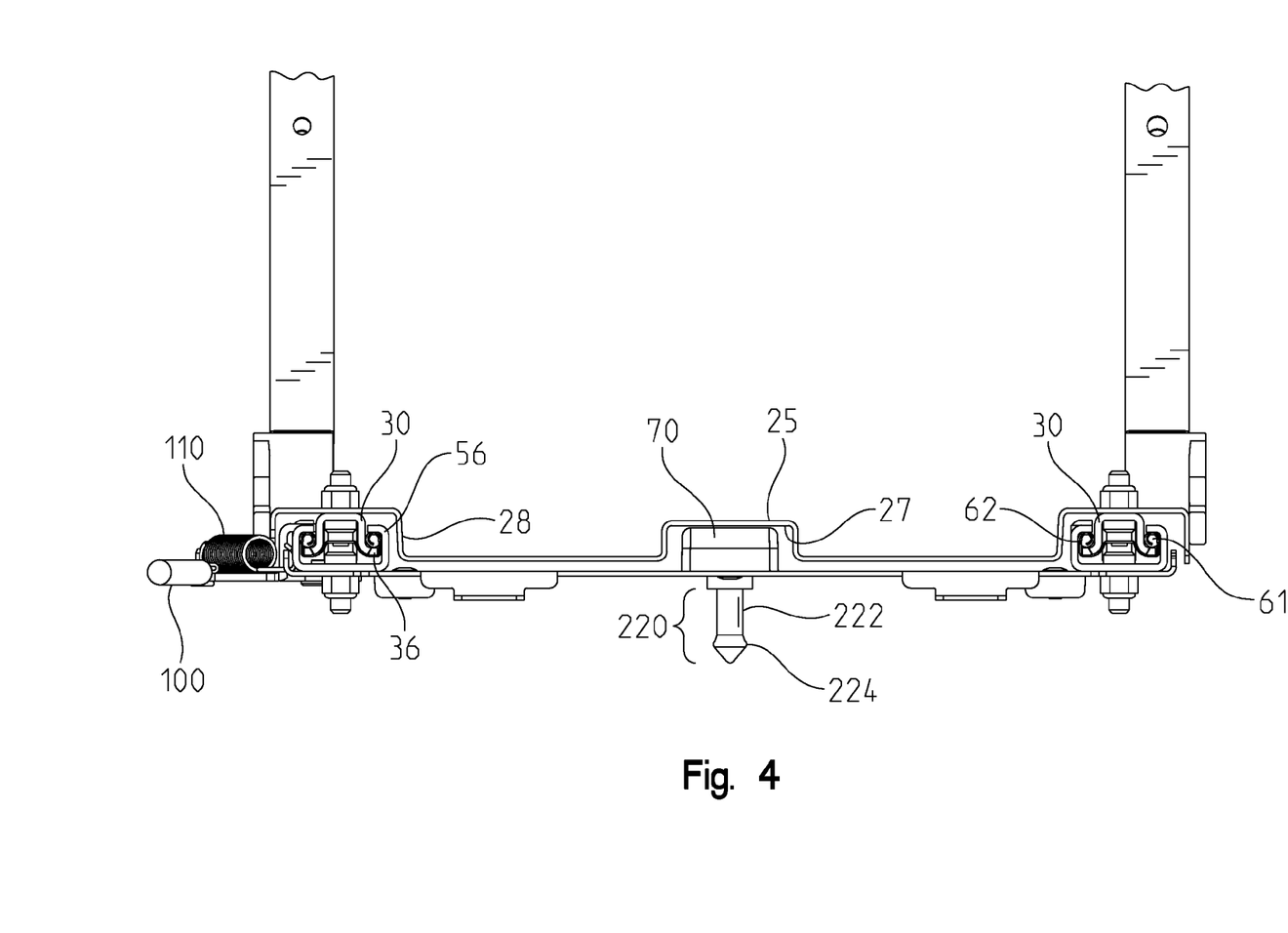
FIG. 4 is a plan front view of an embodiment of the seat support.
Figure 5:
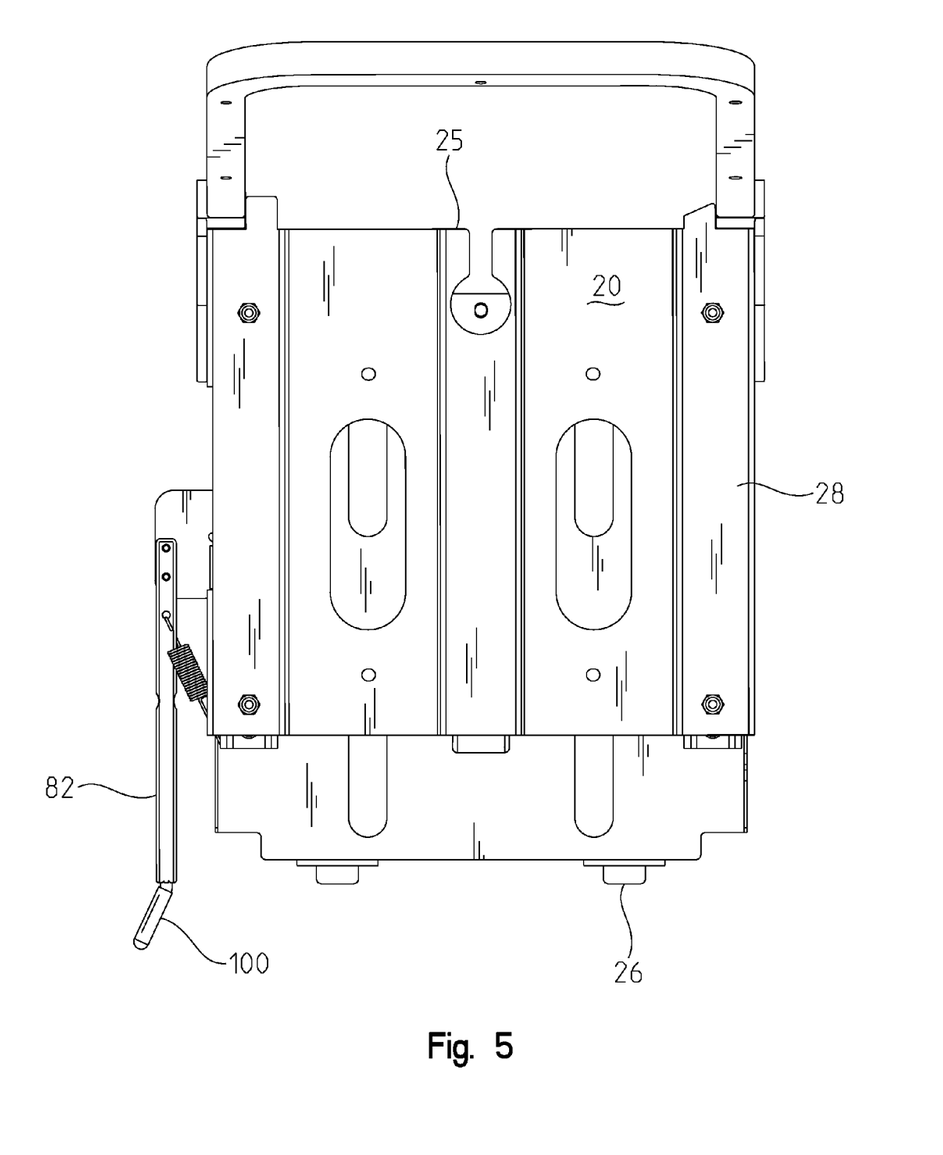
FIG. 5 is a top plan view of the seat support.
Figure 6:
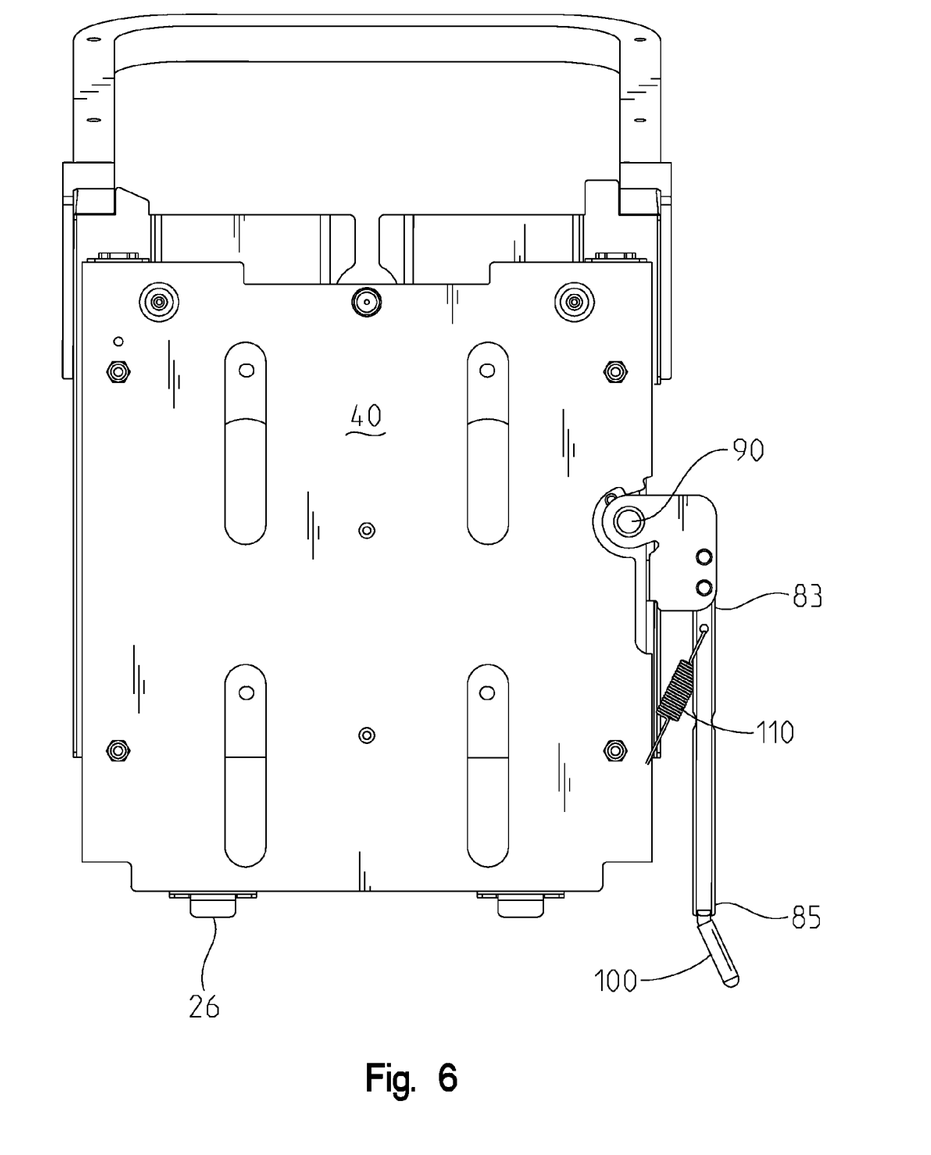
FIG. 6 is a bottom plan view of the seat support.

With reference to FIGS. 3-4, the top and bottom rails 30, 50 are adapted, respectively, to be slidably engageable with each other. In the embodiment illustrated, bearings 61 are contained between the respective top and bottom rails so that the top member 20 can move relative to the bottom member 40 between a forward position and a rearward position. In one embodiment, each of the top rails 30 has an inverted U shape cross section with an inner diameter and bearing feet 36, and each of the bottom rails has a U shaped cross section with an inner diameter and bearing hoods 56. In one embodiment, the bearings are operatively contained between the feet 36 and the hoods 56 retainers 62.

Additionally, a low friction member 70 is located between the top and bottom members 30, 50. The low friction member 70 may be formed from one of several types of sufficiently hard engineering plastics with superior dimensional stability and a coefficient of friction not greater than 0.15. The Applicants prefer (poly)acetals, namely polyoxymethylene (POM) typically injection-molded. Ticona of Florence, Ky., manufactures the most preferred material under the trademark CELCON. The low friction member 70 supports the top member 20 during vehicle travel and movement of the seat, which prevents the top member from becoming deformed and ruining the mechanics of the rails over time.

In one embodiment, a low friction member 70 is centrally located between the top and bottom members 20, 40 and extends most of the distance between the fronts and backs 22, 42, 24, 44, respectively, of the top and bottom members. Additional low friction members 70 located at various positions and compartmentalized as described between the top and bottom members may be designed accordingly.

In the embodiment illustrated, the top member 20 has a central upstanding channel 25 extending from front 22 to back 24 that serves to compartmentalize the low friction member 70, as shown in FIG. 4. This provides improved resistance to torsion forces delivered to the seat support during travel. In the case of large statured seat occupants, the bearing load may cause the top member to bend slightly causing the underneath surface 27 of the top member 20 to contact the novel low friction member 70 during movement between the forward and rearward positions. This, too, resists wear and tear to the rails 30, 50 of the seat support.

Figure 1:
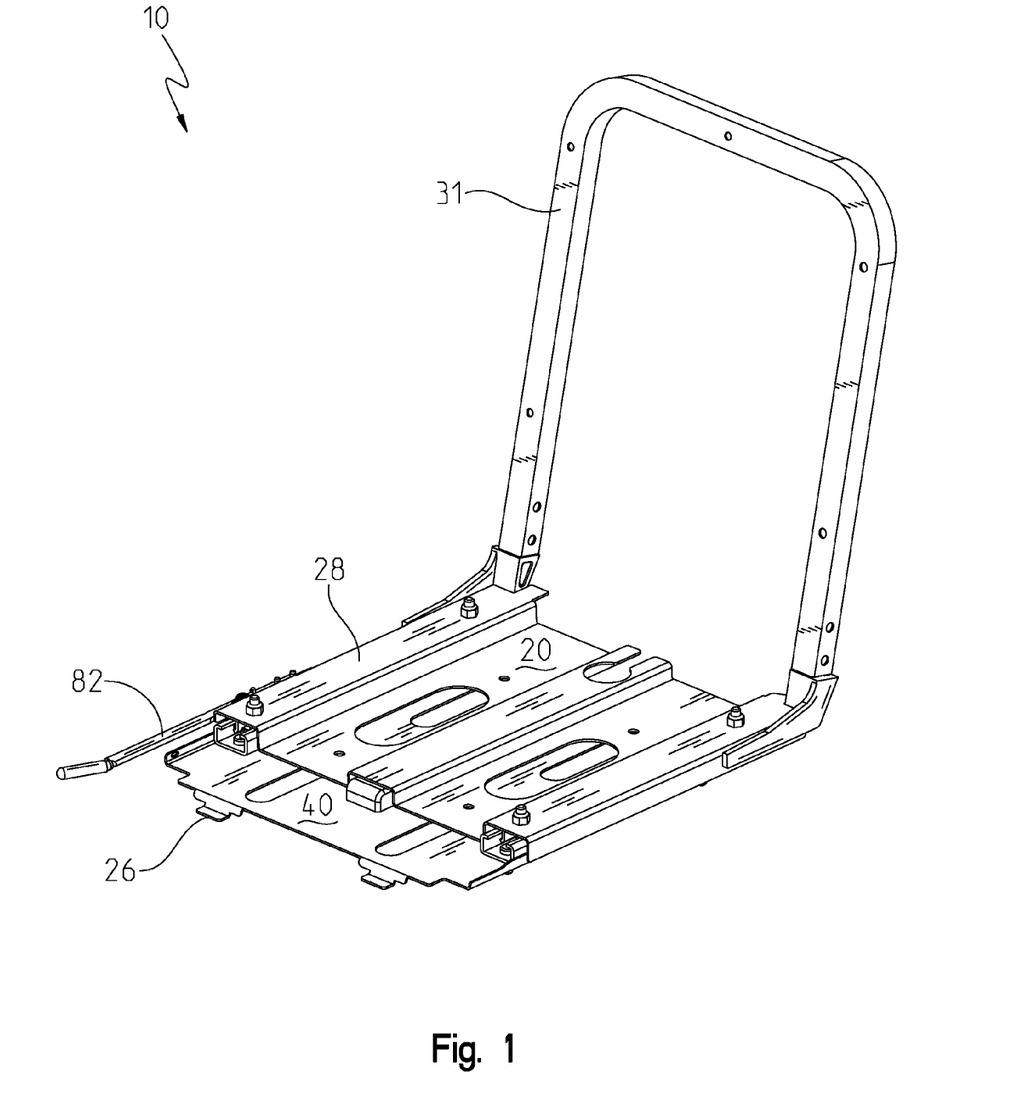
FIG. 1 is a perspective view of the seat support.
Figure 2:
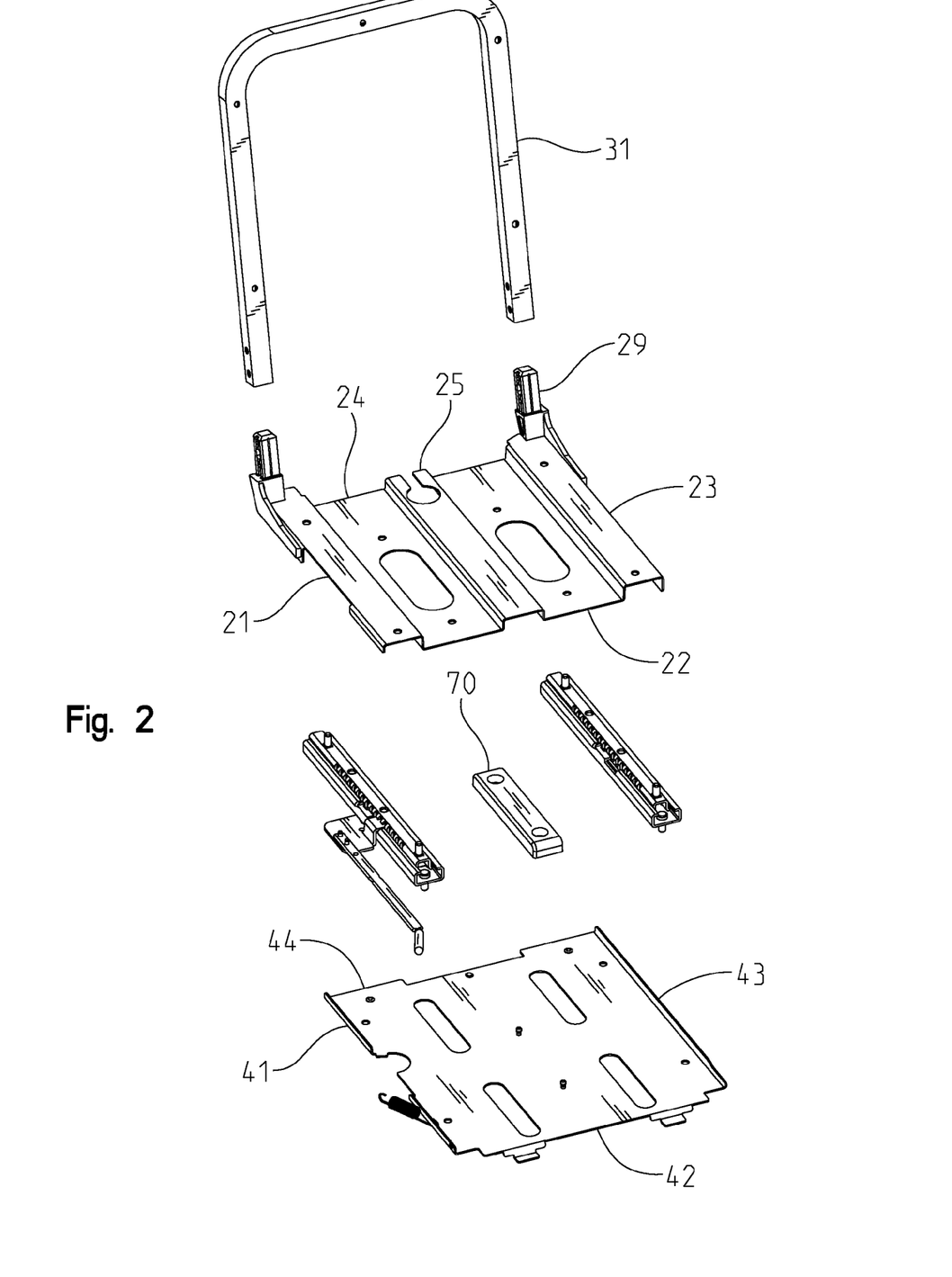
FIG. 2 is an exploded perspective view of the seat support.

Referring to FIGS. 2-3, one of the bottom rails 50 carries an adjustable lock 80 for releasably locking the top member 20 to the bottom member 40 in the forward position, the rearward position and therebetween. The adjustable lock 80 includes a lever arm 82 connected at one end 83 to one of the bottom rails 50 at a pivot 90. Generally, the lock is adapted to pivot in and out of locking engagement alone the length of its respective top rail 30 so that the top member 20 can be adjusted or set at incremental predetermined positions, including the forward position, the rearward position or there between. In one specific embodiment, one end 85 of the lever arm 82 includes a handle 100 extending obliquely outward from the arm 82 opposite the pivot end so an occupant can easily access the handle 100, which protrudes from beneath the seat when installed.

In that embodiment, the cutouts 34 formed in the top rail 30, as best shown in FIG. 3, receive teeth 84 formed in the working, or engagement portion 86 of the lock 80 near the pivot 90. A spring 110 is attached at one end to the bottom member 40 to the lever arm 82 at the other end to constantly urge the teeth 84 into the cutouts 34. The working portion 86 and the handle 100 pivot in a plane that is the same as that which is defined by the bottom member; and the handle is oriented so that it is parallel to the rail 50 when the teeth 84 are in locking engagement with the cutouts 34 for further compartmentalization of the handle and the lock.

The slideably engageable rails, the complementarily shaped top and bottom members and low friction support member yield compartmentalized and sturdier adjustable seat support. The invention improves manufacture and vehicle seating dynamics while offering improved occupant safety as a result of the lower center of gravity as well.

Figure 8:
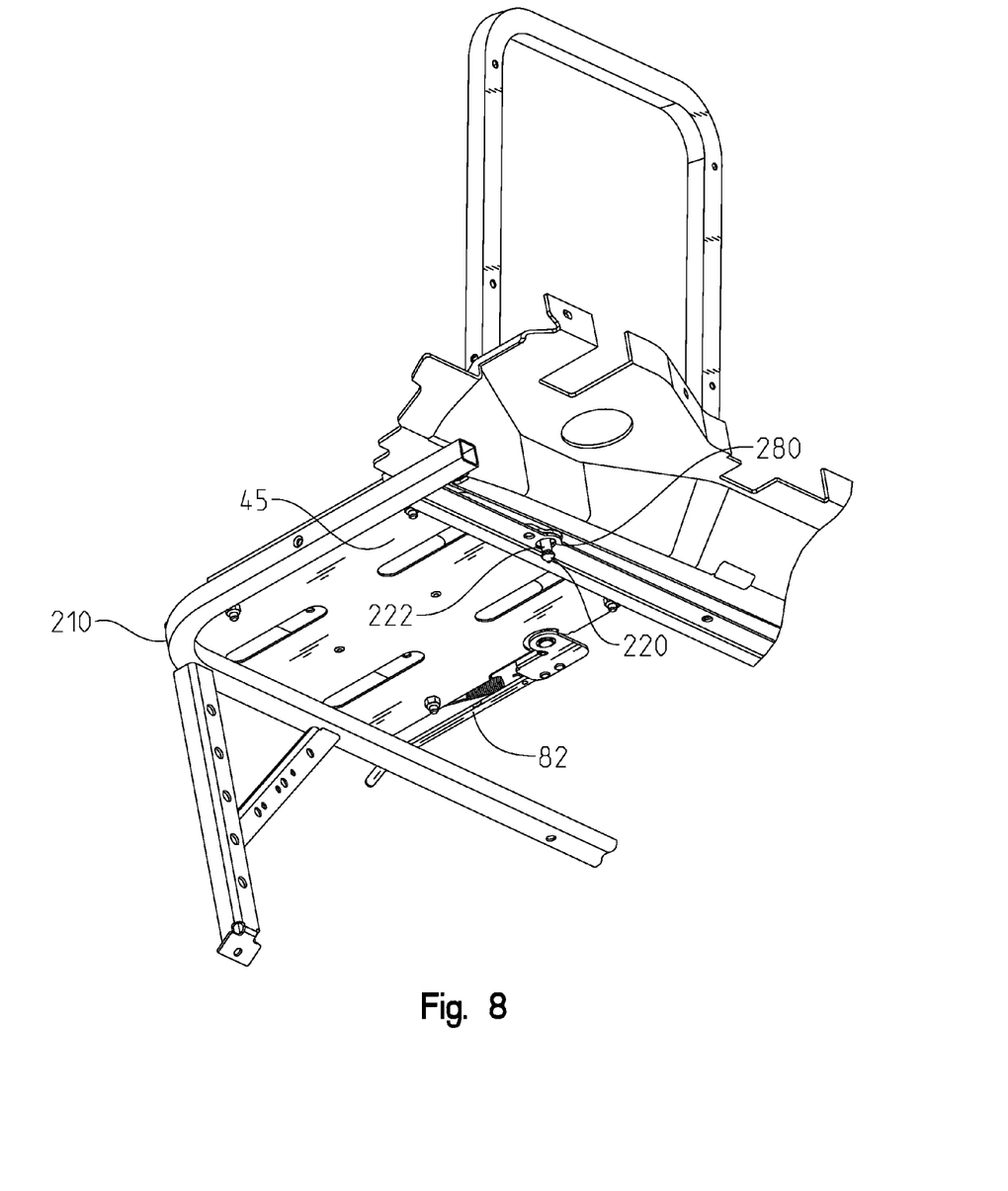
FIG. 8 is a bottom partial cutaway perspective view of an embodiment of the vehicle of the invention shown with the seat support secured to the frame.

FIGS. 7-8 illustrate a portion of an exemplary all terrain vehicle (ATV) 200 contemplated by the invention. The ATV includes a frame 210 for supporting either a single driver side seat or both a driver and passenger side seat support. Only the driver side is shown for illustrative purposes. The rails 30, 50 are aligned in the longitudinal direction of the vehicle. The seat can be incrementally adjusted and locked into position on the rail 50 and moved to and fro in the same longitudinal direction as discussed above.

The unique low profile low friction adjustable seat support 10 may be original equipment installed upon manufacture of the all terrain vehicle (FIGS. 7-8). The frame 210 supports the from 42 and back 44 of the seat support. Skilled artisans should recognize that numerous mechanical means may be used for releasably securing the seat support 10 to the vehicle frame 210. In the embodiment shown in FIGS. 7-8, however, cutouts 226 formed in the frame receive the tabs 26 to releasably secure the front of the bottom member 40 of the seat support. In the rear, an anchor pin 220 extends downwardly from underneath side 45 of the back 44 of the bottom member 40.

The pin 220 extends through a hole 280 in the frame and is releasably secured to the frame using known securing means (not shown), such as a biased pivoting hook that may be pivoted so that the hook, which may be constantly biased by, for example, a coil spring, surrounds the shaft 222 below the head 224 of the pin 220 to releasably secure the seat to the frame 210. In this manner, the seat 10 may be removed from the frame 210 by tilting the seat forward so that the tabs 26 can be maneuvered out of the cutouts 226 and the seat removed. Alternatively, by employing the steps just described in reverse, the new seat support may be retrofitted into an all terrain/off-highway vehicle and transform a traditional non-adjustable seat assembly into an adjustable one without affecting the seat height.

For the purposes of promoting an understanding of the principles of the invention, specific embodiments have been described. It should nevertheless be understood that the description is intended to be illustrative and not restrictive in character, and that no limitation of the scope of the invention is intended. Any alterations and further modifications in the described components, elements, processes, or devices, and any further applications of the principles of the invention as described herein, are contemplated as would normally occur to one skilled in the art to which the invention relates.

The invention claimed is:

1. A vehicle seat support comprising:
   a. a top member with opposite sides, a front and a back, a pair of top rails carried by the top member one of each rails located at said opposite sides;
   b. a bottom member with opposite sides, a front and a back, the bottom member supports a pair of bottom rails one each located at said opposite sides of the bottom member, wherein the top and bottom rails are adapted, respectively, to be slidably engageable upon bearings contained between the respective top and bottom rails so that the top member can move relative to the bottom member between a forward position and a rearward position;
   c. an adjustable lock for releasably locking the top member to the bottom member in the forward position, the rearward position and there between; and
   d. at least one low friction member residing between the top and bottom members for supporting the top member during said movement.

2. The vehicle seat support according to claim 1, wherein the adjustable lock includes a lever adapted to pivot in and out of locking engagement along the length of a top rail.

3. The vehicle seat support according to claim 1, wherein said at least one low friction member is centrally located between the opposite sides of the top and bottom members.

4. The vehicle seat support according to claim 1, wherein each of the top rails has an inverted U shaped cross section with an inner diameter and bearing feet, and each of the bottom rails has a U shaped cross section with an inner diameter and bearing hoods, and bearings operatively contained between said feet and said hoods.

5. A vehicle comprising:
   a. a rail in a longitudinal direction of the vehicle;
   b. a seat support having a top member and a bottom member;
   c. the seat support adapted for securing on the rail, the seat support being adjustable in position in the longitudinal direction of the vehicle;
   d. a lock for releasably locking the seat support in a forward position, a rearward position and there between; and
   e. at least one low friction support member located between the top and bottom members, at least two channels formed in the top member, one of said channels matches the shape of the low friction support member, and the other of said channels matches the shape of the rail for close registration between the top member and the support member and the rail.

6. The vehicle according to claim 5, further comprising at least a pair of top rails secured to the top member, and the rail for which the seat support is adapted comprising at least a pair of bottom rails secured to the bottom member, each of the bottom rails has a U shaped cross section with an inner diameter and bearing hoods, and each of the top rails has an inverted U shaped cross section with an inner diameter and bearing feet, bearings are operatively contained between said feet and said hoods so that the top and bottom rails are slideably engageable.

7. A vehicle seat support comprising:
   a. a bottom member adapted for attachment to a vehicle;
   b. a top member;
   c. rails secured between the bottom and top members, said rails are adapted to be slidably engageable so that the top member can move relative to the bottom member between a forward position and a rearward position; and
   d. a low friction support member positioned between the top and bottom members, at least one channel formed in the top member, said at least one channel matches the shape of the support member for close registration between the bottom and top members.

8. The seat support according to claim 7, further comprising at least one other channel formed in top member in addition to said at least one channel, said other channel matches the shape of the rails for close registration between the top member and the rails.

9. The vehicle seat support according to claim 8, further comprising an adjustable lock for releasably locking the top member to the bottom member in the forward position, the rearward position and there between.

10. The vehicle seat support according to claim 9, wherein the lock comprising cutouts formed along the length of a top rail carried by the top member, and a lever secured to said bottom member at a pivot so that the lever can pivot in and out of locking engagement with the cutouts.

11. The vehicle seat support according to claim 10, wherein said lever includes a working portion with teeth at one end and a handle component at the other end opposite the working portion, said working portion and said handle component are coplanar with the bottom member and said handle is parallel to said rail when the teeth are in locking engagement with the cutouts for compartmentalization of the handle and the lock.

* * * * *